United States Patent [19]

Takahashi et al.

[11] Patent Number: 4,651,773
[45] Date of Patent: Mar. 24, 1987

[54] THROTTLE VALVE ASSEMBLY

[75] Inventors: Shigeo Takahashi, Anjo; Hiromi Hasegawa, Obu; Choji Furusawa; Kunio Morisawa, both of Okazaki, all of Japan

[73] Assignees: Aisin Seiki Kabushiki Kaisha; Toyota Jodosha Kabushiki Kaisha, both of Aichi, Japan

[21] Appl. No.: 751,969

[22] Filed: Jul. 5, 1985

[30] Foreign Application Priority Data

Jul. 5, 1984 [JP] Japan ................... 59-137870
Jul. 5, 1984 [JP] Japan ................... 59-137871
Jul. 17, 1984 [JP] Japan ................... 59-146930

[51] Int. Cl.⁴ ............... B60K 17/00; B60K 41/00; F16K 43/00
[52] U.S. Cl. ................... 137/315; 74/865; 74/867; 74/868; 137/636.1; 137/637; 251/263
[58] Field of Search ........... 137/636, 636.1, 637, 137/637.1, 637.2, 315, 596.1, 596.2; 74/862, 865, 867, 868, 870; 251/251, 263

[56] References Cited

U.S. PATENT DOCUMENTS

| | | | |
|---|---|---|---|
| 3,079,122 | 2/1963 | Schneider | 251/263 |
| 3,485,315 | 12/1969 | Bergren | 137/596.2 |
| 3,543,611 | 12/1970 | Uotumi et al. | 74/868 |
| 4,091,690 | 5/1978 | Miyao | 74/865 |
| 4,467,674 | 8/1984 | Van Deursen et al. | 74/867 |
| 4,476,746 | 10/1984 | Miki et al. | 74/870 |
| 4,534,243 | 8/1985 | Yokoyama et al. | 74/868 |

*Primary Examiner*—George L. Walton
*Attorney, Agent, or Firm*—Burns, Doane, Swecker & Mathis

[57] ABSTRACT

A throttle valve assembly for displacing the plungers of at least two contiguous throttle valves in correspondence with the degree of throttle opening of an engine includes a first cam rotatably mounted on a stationary bracket fixed to the throttle valve bodies and having a cam face for displacing the plunger of the first throttle valve and an axially extending boss, a second cam rotatably mounted on the bracket and having a cam face for displacing the plunger of the second throttle valve and an axially extending boss, the first and second cams being coupled via coupling means formed on the opposing bosses, and a cable operatively associated with the engine torque demand for rotating the cams. The cam faces of the cams are formed to have a shape capable of providing the desired throttle pressure characteristic, the shapes of the cam faces differing from each other in order to obtain the optimum speed-change performance.

9 Claims, 10 Drawing Figures

THROTTLE VALVE ASSEMBLY

BACKGROUND OF THE INVENTION

This invention relates to throttle valve means arranged in the hydraulic circuit of an automatic transmission and, more particularly, to a throttle valve assembly for displacing the pressure regulating means of at least two throttle valves in correspondence with the degree of throttle opening of an engine.

The growing popularity of vehicles having an automatic transmission has been accompanied by stricter evaluation of the speed change performance of such transmissions. In particular, a speed-change shock produced when a gear train is changed over to alter the speed-change ratio can only be evaluated in terms of "feel", and even a slight shock of this kind is annoying. Various methods and apparatus have heretofore been proposed and put into practical use in order to mitigate or eliminate such speed-change shock. Furthermore, coupled with the trend toward front-engine automotive vehicles with front wheel drive, there is a demand for automatic transmissions which are smaller and lighter in weight.

Fundamental in smoothly controlling the speed change of an automatic transmission is to adopt a method of varying main pressure, mainly the pressure of the fluid which actuates the frictional engaging means that administers speed change control in dependence upon the output of the engine. Ordinarily, main pressure is varied by a throttle valve assembly which generates pressure (throttle pressure) commensurate with the throttle opening of the engine. The throttle pressure, in cooperation with governor pressure dependent upon vehicle speed, is also used as a signal which changes over shift control valves.

A throttle valve assembly of this type is disclosed in the specification of Japanese Utility Model Application Laid-Open No. 58-135547. The disclosed throttle valve assembly is adapted to apply a throttle pressure, which is produced by a second throttle valve, as back pressure of an accumulator for controlling the extent to which pressured oil is supplied to frictional engaging means, and to changeover the shift control valve by employing throttle pressure, which is produced by a first throttle valve, in cooperation with governor pressure. As for the pressure regulation of the first and second throttle valves, plungers inside the valves are displaced by levers connected to the accelerator pedal, and a load acting upon a pressure regulating spring is changed by the plungers.

Alternatively, rotary cams may be used in place of the levers, in which case the cams are made to rotate by cables connected to the engine throttle.

SUMMARY OF THE INVENTION

When attempting to perform a smoother change of speeds with an automatic transmission, it is desirable to use a plurality of throttle valves and cause the valves to generate pressures having different throttle pressure characteristics corresponding to various conditions, and to control or actuate corresponding equipment in the hydraulic pressure circuitry on the basis of these throttle pressure characteristics.

To this end, it is necessary to apply the cam means to the two throttle valves and separately set, as required, the displacement of the throttle valve pressure regulating means with respect to the rotation of the cam means.

However, this presents a problem in view of the requirement for smaller, lighter automatic transmissions for the front-engine, front-wheel drive vehicles mentioned above. This requirement is difficult to satisfy because the two throttle valve assemblies must be housed in the limited confines of the transmission, the cam means must be provided for each of the throttle valves, and the engine throttle must be connected to each of the cam means.

Further, in order to mitigate or eliminate the shock sustained when changing speeds, it is necessary to design the cam surfaces while taking into account differences in engine power(or output torque) or differences in vehicle weight. With the conventional throttle valve assembly, however, the structure adopted is such that the levers are actuated by a rotary shaft journaled at an appropriate position in the transmission case and act to displace the plungers of the throttle valves. The levers are difficult to replace and this approach does not lend itself to a manufacturing process in which a wide variety of items are manufactured in small lots.

The present invention has been devised to satisfy the abovementioned requirements and to solve the aforementioned problems, and an object of a first aspect of the present invention is to provide a throttle valve assembly which can be housed in the limited confines of a transmission, which is capable of a design change that takes into account differences in engine power (or output torque) and differences in vehicle weight, and which is suitable for manufacturing process in which a wide variety of items are manufactured in small lots.

Another problem with the foregoing conventional structure is that since the valve bodies and lever means are installed in the transmission case individually and independently, the positional relationship between the throttle valves and levers cannot be set in accurate fashion, with the result that accurate plunger displacement corresponding to throttle opening becomes impossible to obtain.

Furthermore, with the conventional assembly, a stopper abutting against one lever determines the position of the lever when the throttle opening is zero. However, the position of the stopper is decided solely by the position of the throttle valve relative to the plunger, with the result that control in the vicinity of zero throttle opening is unstable. Another problem is that the speed change characteristic differs from one automatic transmission to another depending upon the method used to mount the lever means.

An object of a second aspect of the present invention is to satisfy the abovementioned requirements and to solve the aforementioned problems. More specifically, a second object of the invention is to provide a throttle valve assembly which can be housed in the limited confines of a transmission, and in which the mounting method does not cause a major change in the position of a shaft for supporting cam means, thereby allowing production of an accurate throttle pressure corresponding to throttle opening.

In a known throttle valve assembly, displacement of a cable connected to the engine throttle is converted into rotational motion transmitted to cam means, and a throttle element of a throttle valve is in turn displaced and actuated by the cam means. The assembly uses an ordinary rotary cam as the cam means, the cam means is positioned to face a valve bore in which there are fitted a throttle valve and a valve element in series with the throttle valve, and a shaft disposed at a position perpendicularly intersecting an extension of the valve bore is supported by being screwed into the valve body.

In order to mitigate or eliminate speed-change shock, it is necessary to actuate the throttle valve in a precise manner.

With the construction of the conventional throttle valve assembly, however, the threaded hole for the shaft supporting the cam means is difficult to form in the valve body with good accuracy, and careful positioning is essential in order to assure that the position at which the support shaft is screwed with respect to the valve bore does not vary from one part to another. A further problem with the conventional assembly is the possibility that looseness may develop between the valve body and the shaft where the two are screwed together, this being caused by frequent cam operation.

An object of third and fourth aspects of the present invention is to satisfy the abovementioned requirements and to solve the aforementioned problems. More specifically, a third object of the invention is to provide a throttle valve assembly which can be housed in the limited confines of a transmission, and in which the mounting method does not cause a major change in the position of the shaft for supporting cam means, thereby allowing production of an accurate throttle pressure corresponding to throttle opening.

According to the first aspect of the present invention, there is provided a throttle valve assembly comprising first and second throttle valves adjoining each other, cam means rotatably mounted on a fixed member, said cam means including a first cam having a cam face for displacing a valve element of the first throttle valve and a boss extending in the axial direction, and a second cam having a cam face for displacing a valve elexent of the second throttle valve and a boss extending in the axial direction, the first and second cams being connected via coupling means formed on the opposing bosses, and an input member operatively associated with an engine torque demand signal for rotating the cams of the cam means.

Since the first and second throttle valves are arranged to adjoin to each other, the valve bodies in this case can be integrated into a single unitary body. It is preferred that the cams of the cam means rotatably mounted on the fixed member be coaxially supported at the bosses on a shaft member through the intermediary of a retaining member. A part such as a bracket can be used at the fixed member, and the shaft member can be secured to the bracket.

The coupling means formed on the bosses can be cut-outs or gears formed on the distal ends of the opposing bosses, or may be spline-like portions formed on the inner and outer sides of the bosses. Resilient means for applying a restoring force to the cams can be provided. Selecting a torsion spring as the resilient means enables the assembly to be made small in size. In such case, the torsion spring is wound on the outer periphery of the bosses of the first and second cams between these cams. One end of the spring is fastened to either the first or second cam, and the other end of the spring is fastened elsewhere.

The input member is connected to either the first or second cam.

The cam faces of the cams for displacing the pressure regulating means of the throttle valves in dependence upon throttle opening are formed to have a shape capable of providing the desired throttle pressure characteristic. The cam faces can be made to differ from each other in terms of shape in order to obtain the optimum speed-change performance.

According to the second aspect of the present invention, there is provided a throttle valve assembly comprising first and second throttle valves adjoining each other, a generally U-shaped bracket attached to front sides of the first and second throttle valves and having a base portion, two generally parallel side portions formed by bending the base portion upward from both sides thereof, and mounting portions formed by bending the two side portions, cam means accommodated in the generally U-shaped bracket, the cam means comprising a support shaft supported on the bracket, a first cam rotatably mounted on the support shaft for displacing a valve element of the first throttle valve, and a second cam operatively associated with the first cam for displacing a valve element of the second throttle valve, and an input member operatively associated with an engine torque demand signal for rotating the cams of the cam means.

According to the third aspect of the present invention, there is provided a throttle valve assembly comprising throttle valves accommodated in respective valve bores formed in a valve body for regulating hydraulic pressure to bring said pressure into conformance with a predetermined pressure, valve elements for being displaced so as to vary the regulating action of the throttle valves, a bracket secured to the valve body and having faces perpendicular to the central axes of the respective valve bores formed in the valve body, and a face parallel to the central axes of the valve bores, cam means rotatably mounted on a support shaft supported on the bracket and having cam faces for displacing the valve element of the throttle valves, an input member capable of providing an input signal for rotating the cam means in response to an engine torque demand signal, and resilient means for applying a rotating force to the cam means in opposition to the input signal.

According to the fourth aspect of the present invention, there is provided a throttle valve assembly comprising at least first and second throttle valves adjoining each other, a bracket of a generally U-shaped configuration having a base portion and two generally parallel side portions formed by bending the base portion upwardly from both sides thereof, the bracket including first mounting portions formed by bending the two side portions and having faces perpendicular to the central axes of valve bores formed in respective valve bodies, and a second mounting portion formed by bending one of the two side portions and having a face parallel to a plane containing at least two axes of the valve bores, a support shaft supported on the bracket, cam means comprising a first cam having a cam face for displacing valve element of the first throttle valve, and a second cam connected to the first cam and having a cam face for displacing valve element of the second throttle valve, an input member capable of providing an input signal for rotating the cam means in response to an engine torque demand signal, and resilient means for applying a rotating force to the cam means in opposition to the input signal. Common through all the aspects, the valve element may be a plunger and/or spool or the like.

The second through fourth aspects of the invention share a number of points in common. Specifically, as in the first aspect of the invention, the first and second throttle valves are arranged to adjoin each other but the valve bodies can be constructed as a single unitary body. The front sides of the throttle valves are formed to include a portion to which the mounting portions of the bracket are secured. The cam means accommodated within the bracket are assembled while being brought into agreement with the plungers of the throttle valves.

The operative association between the first and second cams of the cam means can be achieved by coupling means formed on the distal ends of opposing bosses of the two cams. In addition, if the cam face of the first cam of the cam means is provided with a stopper for abutting against the side face of the plunger of the first throttle valve, the angular position of the first cam when the throttle opening is zero can be set in a reliable manner. The cam means can also be provided with resilient means in order to assure the restoration of the cams.

The cams can be provided with a restoring force, namely a rotating force which opposes the input signal, if a torsion spring is provided as the resilient means, the torsion spring is wound between the first and second cams on the outer periphery thereof, one end of the spring is fastened to either the first or second cam, and the other end of the spring is fastened to a portion other than the first or second cam. With such an arrangement, an effective restoring action can be achieved in a smaller space.

Using a cable connected to the engine throttle as the input member and guiding the cable around the periphery of a cam enables the cams to be rotated with just a small torque.

It goes without saying that the cam faces of the cams for displacing the pressure regulating means of the throttle valves in dependence upon throttle opening are each formed to have a shape that will enable the desired throttle pressure characteristics to be obtained.

To assemble the throttle valve assembly, both of the cams interconnected by the coupling means are placed inside the generally U-shaped bracket and the support shaft is passed through holes in both cams from one side of the bracket so that the cams are rotatably supported on the shaft. Next, the mounting portions of the bracket are placed on predetermined portions on the front sides of the first and second throttle valves and are secured thereto by fixing means such as bolts. Finally, the input member operatively associated with the engine throttle, e.g., the cable connected to the engine throttle, is wound on the outer periphery of one of the cams.

In the operation of the throttle valve assembly, which is common throughout all the aspects of the present invention, the cams are rotated by the input member, which is operatively associated with the engine throttle, when the accelerator pedal is depressed. The cam faces, which are formed such that desired throttle pressure characteristics will be obtained in dependence upon throttle opening, displace the plungers, i.e., the valve elements, of the throttle valves to vary the pressure regulating means. Since the first and second cams are set in correspondence with the first and second throttle valves, these valves produce throttle pressures that improve the speed-change performance. One of the throttle pressures produced in the respective valve in accordance with throttle opening is used as back pressure for deciding line pressure, thereby supplying the hydraulic equipment with pressured oil in an accurate manner. The other of the throttle pressures produced in the respective valve acts upon a shift valve as back pressure opposing governor pressure, thereby deciding precise changeover timing of the shift valve. When the plungers (valve elements) are employed as valves for changing over the hydraulic equipment, the hydraulic equipment is operated precisely in dependence upon throttle opening. If the amount by which the accelerator pedal is depressed is increased, the cams are rotated further; if decreased the cams are restored by the pressure regulating means or by the resilient means.

According to the second through fourth aspects of the invention, since both valves and the cam means are assembled together in coordination by the bracket (in particular, between the valve body and the bidirectional mounting portions of the bracket), accurate throttle pressure corresponding to throttle opening can be produced even when the degree of throttle opening is diminished. This enables the hydraulic equipment to be operated in an accurate manner.

ADVANTAGES OF THE INVENTION

According to the first aspect of the present invention, the first and second cams are connected by the coupling means. Therefore, the cam profiles of the cam faces on both cams can be set as desired so that any hydraulic pressure characteristic corresponding to a single input (throttle opening) can be obtained. In addition, the first and second cams can be replaced to alter the hydraulic pressure characteristics in accordance with a difference in engine output or vehicle weight. The valve assembly therefore readily lends its to an era in which parts of diverse types are produced in small lots and, hence, is of great industrial value. Furthermore, since resilient means such as the torsion spring can be provided between both cams, the overall throttle valve assembly can be made compact so that two throttle valves can be arranged in the limited space of an automatic transmission case. Cam means can be provided for each throttle valve and each cam can readily be coupled to the engine throttle.

According to the second through fourth aspects of the invention, the first and second throttle valves are arranged to adjoin each other and the cam means are mounted on the front faces of the valve bodies by being received in the bracket. Accordingly, the overall throttle valve assembly can be made compact so that two throttle valves can be arranged in the limited space of an automatic transmission case. Cam means can be provided for each throttle valve and each cam can readily be coupled to the engine throttle.

Furthermore, since the bracket can be attached to the valve bodies while a direct relation is maintained between the bracket and the valve bodies, any error in the set positional relationship between the cam means and the plungers is minimized so that each throttle valve can accurately produce a throttle pressure corresponding to the throttle opening. Moreover, since the positions of the cams at zero throttle opening are limited in terms of their relation to the plungers, it is possible to carry out an accurate sequence.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Specific embodiments of the present invention will now be described with reference to the accompanying drawings, though it should be understood that the invention is not limited to the illustrated embodiments.

FIRST EMBODIMENT

Figure 2:
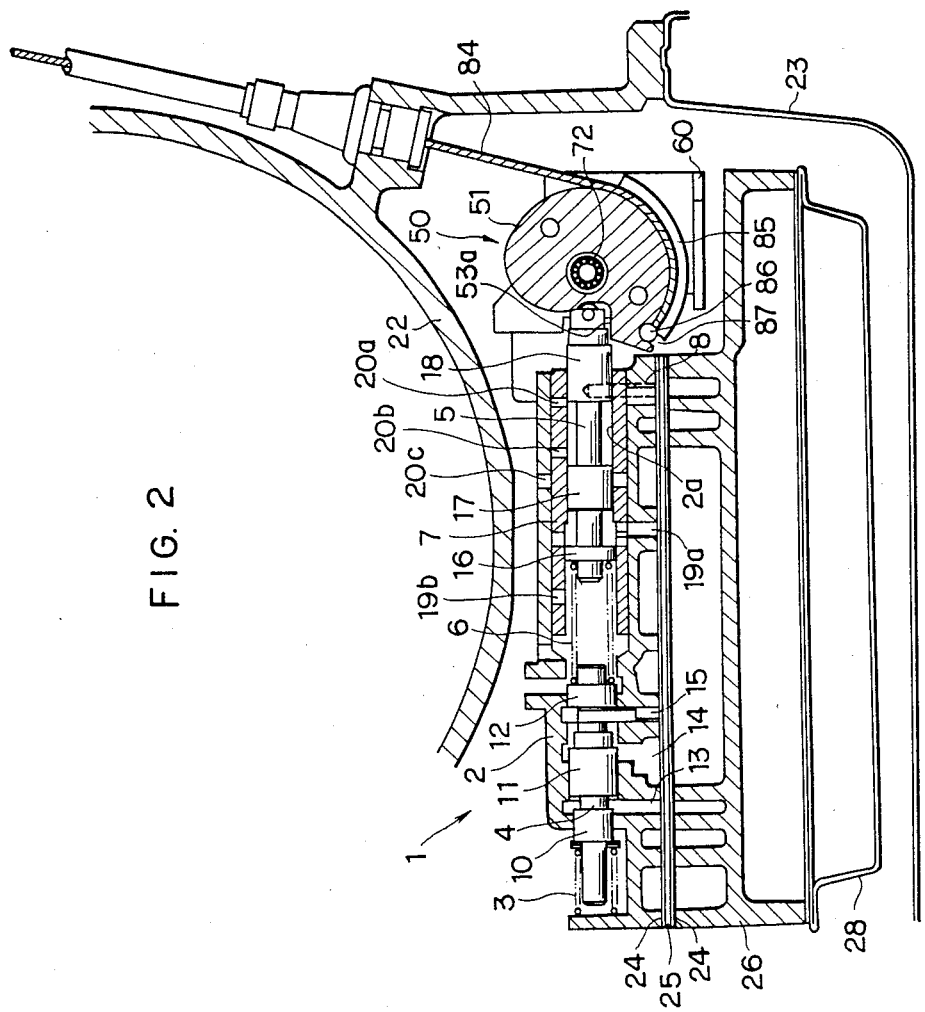
FIG. 2 is a sectional view taken along line II—II of FIG. 1.

A first throttle valve 1 illustrated in FIG. 2 is a throttle valve for shift control, the valve having an output port connected to one back pressure port of a plurality of shift valves. The first throttle valve cooperates with governor pressure connected to the other back pressure port of each shift valve to actuate the shift valves and suitably select friction engaging devices connected to the shift valves, thereby performing a speed change conforming to the throttle opening and vehicle speed. The first throttle valve 1 also sends a release signal to a lock-up relay valve at a throttle opening near zero. In response to the signal from the first throttle valve, the lock-up relay valve breaks a direct connection between the turbine and the pump of a torque converter.

The first throttle valve 1 has a spool 4 backed at one end (the left end in the figure) by a spring 3, a plunger (valve element) 5 arranged in series with the spool 4, and a pressure regulating spring 6 arranged between the spool 4 and the plunger 5, these elements being provided in a valve body 2. The plunger 5 is guided by a sleeve 7, which is secured to the valve body 2 by a pin 8. The spool 4 is formed to include three lands 10, 11, 12 in the order mentioned starting from the side on which the backing spring 3 is located, and the valve body 2 is formed to include three ports 13, 14, 15 corresponding to the three lands 10, 11, 12, respectively. In the illustrated embodiment, the lands 11, 12 have the same diameter, which is larger than that of the land 10. The central port 14 supplies pressured oil from the pump. The right port 15 is an output port connected to the port 13, which is a back pressure port, via orifice means, and is also connected to back pressure ports opposing governor pressure of the shift valves.

The plunger 5 also is formed to include three lands 16, 17, 18. The valve body 2 is formed to include five ports 19a, 19b, 20a, 20b, 20c through the sleeve 7 to correspond to the lands. The port 19a on the left side is connected to the port 13 on the side of the spool 4. When the throttle is approximately fully open, communication is established between the port 19b and a port of one of the shift valves, e.g., a 3–4 shift valve. The output of the port 19b in this case is employed as a kick-down signal. The port 20a is provided very close to the land 18 of the plunger 5 and serves to introduce pump pressure at a throttle opening near zero. The port 20b is an output port connected to the back pressure port of the lock-up relay valve. The port 20c is located just to the left of the output port 20b and is used as the discharge port of the lock-up relay valve.

The first throttle valve 1 is arranged between a transmission case 22 and an oil pan 23. A lower valve body 26 is arranged below the valve body 2 so that a gasket 24 and a plate 25 are sandwiched between the valve bodies. A strainer 28 is provided beneath the lower valve body 26.

Figure 3:
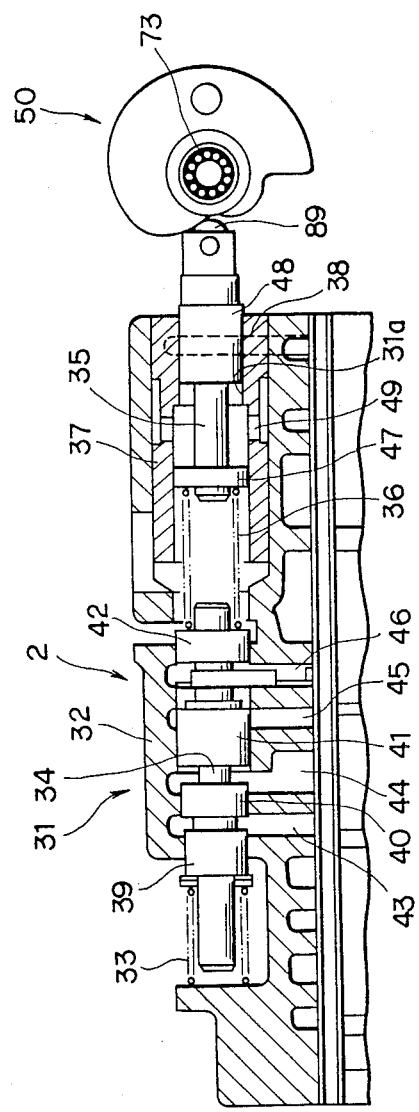
FIG. 3 is a sectional view taken along line III—III of FIG. 1.
Figure 4:
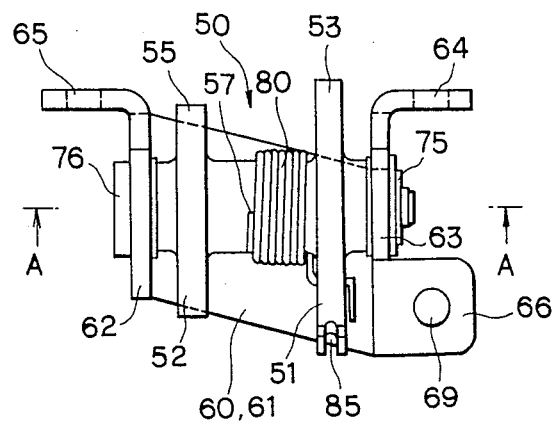
FIG. 4 is a plan view of a bracket accommodating cam means.
Figure 5:
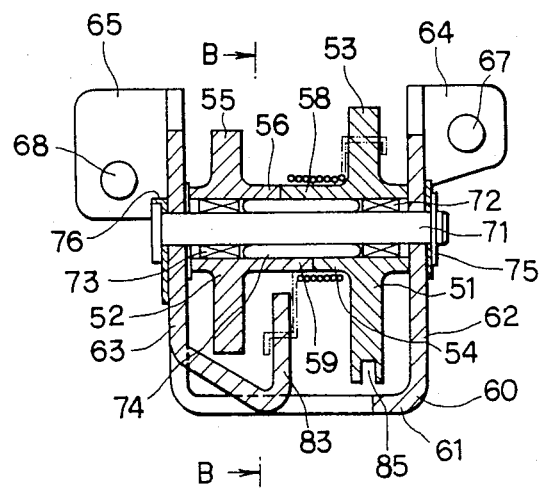
FIG. 5 is a sectional view taken along line A—A of FIG. 4.

A second throttle valve 31 is constructed as shown in FIG. 3. The second throttle valve 31 is for control of main pressure and causes hydraulic pressure, which is regulated in dependence upon throttle opening, to act as back pressure of a regulator valve, whereby the pressured oil from the pump is made to conform to throttle opening to regulate the main pressure in the oil line.

The second throttle valve 31 has a spool 34 backed at one end (the left end in the figure) by a spring 33, a plunger 35 arranged in series with the spool 34, and a pressure regulating spring (pressure regulating means) 36 arranged between the spool 34 and the plunger 35, these elements being provided in a valve body 32 constructed adjacent to and integral with the valve body 2 of the first throttle valve 1. The plunger 35 is guided by a sleeve 37, which is secured to the valve body 32 by a pin 38.

The spool 34 is formed to include four lands 39, 40, 41, 42 in the order mentioned starting from the side on which the backing spring 33 is located. In the illustrated embodiment, the lands 41, 42 have the same diameter, which is larger than that of the land 40, with the diameter of the latter being larger than that of the land 39. The valve body 32 is formed to include four ports 43, 44, 45, 46 corresponding to the four lands 39, 40, 41, 42, respectively. The port 45 is an input port for receiving an input from the pump. Pressured oil regulated by the land 41 is delivered from the port 46. The port 46 communicates with a regulator valve back pressure port, with a drain port via orifice means, with the port 43 via a cut-back valve 105, and with the port 44 via orifice means. The cut-back valve 105 is actuated by governor pressure for communicating the port 46 with the port 43.

The plunger 35 also is formed to include two lands 47, 48, the diameter of the former being larger than that of the latter. The valve body 32 is formed to include one port 49 through the sleeve 37. The port 49 communicates with the back pressure port 43 on the side of the spool 34. Pressured oil which enters from the port 49 acts to move the plunger 35 to the left in FIG. 3.

Figure 1:
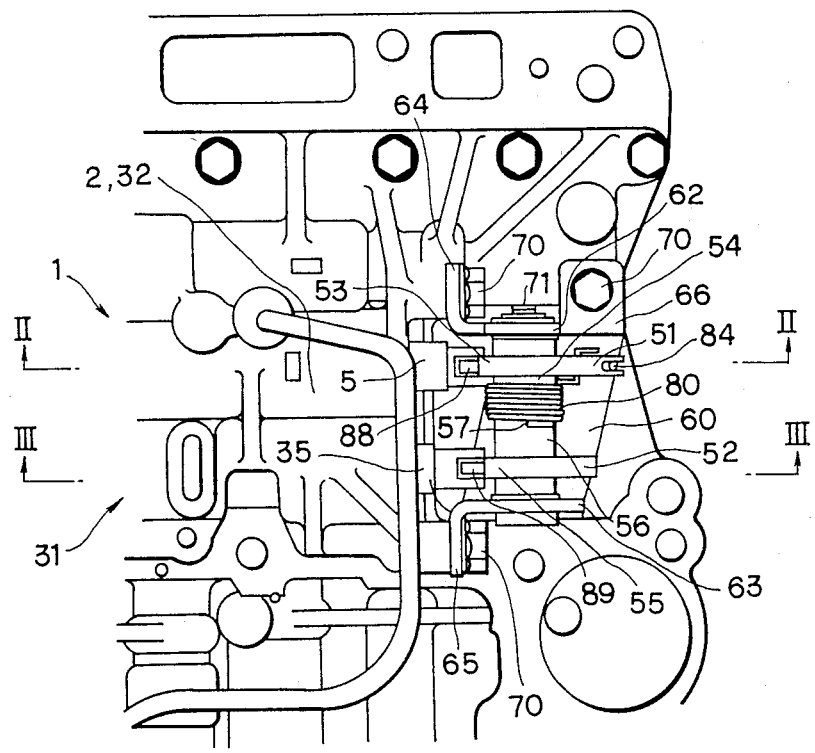
FIG. 1 is a plan view illustrating an embodiment of a throttle valve assembly according to the present invention.

As shown in FIG. 1, the two throttle valves 1, 31 are arranged in parallel and adjacent to each other with the plunger sides thereof in alignment. In the figure the second throttle valve 31 is shown to be arranged in front of the first throttle valve 1.

As shown in FIGS. 4 through 7, cam means 50 comprises a first cam 51 for displacing the plunger 5 of the first throttle valve 1, and a second cam 52 operatively associated with the first cam 51 for displacing the plunger 35 of the second throttle valve 31.

The first cam 51 has a cam face 53 formed on its outer periphery for displacing the plunger 5, and is formed to include an axially extending boss 54. It will be appreciated from FIG. 2 that the cam face 53 is provided with a stopper 53a which determines the position of the cam 51 by abutting against the plunger 5 when the throttle opening is zero. The second cam 52 likewise has a cam face 55 formed on its outer periphery for displacing the plunger 35, and is formed to include an axially extending boss 56. The distal ends of the opposing bosses 54, 56 are provided with coupling means 57, shown in FIGS. 4 and 5, in such a manner that the second cam 52 can be rotated in operative association with the first cam 51. In the meshing means 57 of the illustrated embodiment, half of the distal end of boss 54 of the first cam 51 is cut away to leave a projecting half 58, and half of the distal end of boss 56 of the second cam 52 is cut away to leave a projecting half 59. The projecting halves 58, 59 are fitted into the cut-away portions of the opposing bosses 56, 54, respectively, so that first and second cams 51, 52 will operate in association. Alternatively, the meshing means 57 can be arranged in such a manner that teeth formed in the side surfaces of the bosses 54, 56 mesh with each other.

A bracket 60 (FIG. 5) accommodating the cam means 50 comprises a base portion 61, generally parallel side portions 62, 63 formed by bending the base portion 61 upward from both sides thereof, first mounting portions 64, 65 and a second mounting portion 66 formed by bending the two side portions 62, 63. The overall bracket 60 has a U-shaped configuration. The faces of the first mounting portions 64, 65 lie perpendicular to the central axes of valve bores 2a, 32a formed in the valve bodies 2, 32, and the face of the second mounting portion 66 (FIG. 4) lies parallel to a plane containing the two axes. The positions of the first mounting portions 64, 65 can be set at a distance X from the central axis of the pin 8, as shown in FIG. 2. The position of the second mounting portion 66 can be set a distance Y from the central axis of the valve bore 2a. The pin 8 and valve bore 2a are used as the reference points because this facilitates the setting of the positional relationship between the cam means and the ports of the throttle valves, and because it is easy to set the positions when the throttle opening is zero. The mounting portions 64, 65, 66 are formed to include respective bolt holes 67, 68, 69. The bracket 60 is bolted directly to the front side of the valve bodies 2, 32, which are constructed to adjoin each other in the form of an integral body, by three bolts 70.

Figure 6:
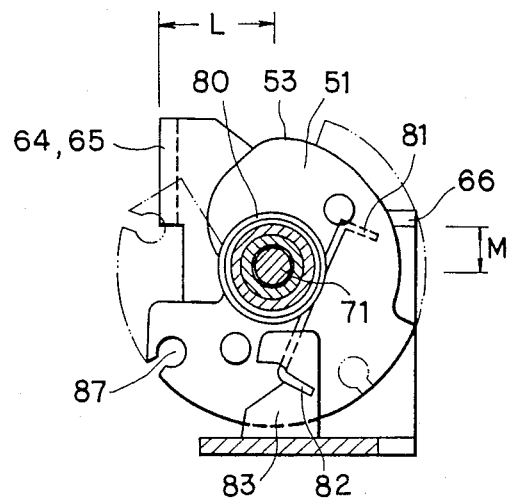
FIG. 6 is a sectional view taken along line B—B of FIG. 5.
Figure 7:
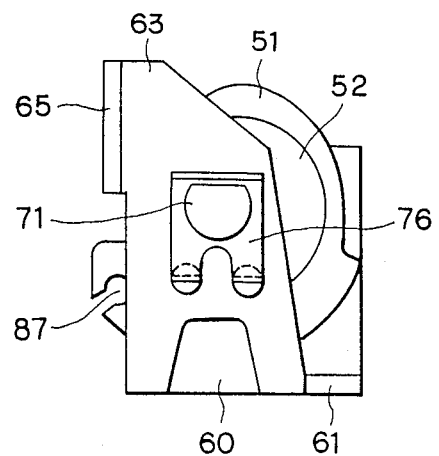
FIG. 7 is a side view of the bracket of FIG. 4 as seen from the left side.

The cam means 50 are supported in the bracket 60 by a support shaft 71 passed through the two side portions 62, 63 of the bracket 60. On the basis of the aforementioned dimensions X and Y, the position of the support shaft 71 in the bracket 60 can be set accurately at a distance L from the upper faces of the first mounting portions and at a distance M from the lower face of the second mounting portion 66, as shown in FIG. 6, while correspondence is maintained with respect to the valve bores 2a, 32a. Bearings 72, 73 are arranged between the support shaft 71 and the cam means 50 to facilitate rotation. Fitted into the inner sides of the bosses 54, 56 between the bearings 72, 73 is a cylindrical retaining member 74 for retaining the cams 51, 52 in a concentric relationship. In an alternative arrangement, it is possible to maintain the concentricity of the cams 51, 52 by fitting a retaining member over the outer sides of the bosses 54, 56. In such case it would be possible to provide the abovementioned meshing means between the bosses 54, 56 of the two cams and the retaining member 74, with the meshing means in such a configuration being of the spline-fitting type. It should be noted that the support shaft 71 is prevented from falling out by a snap ring 75 fitted thereon on the outer side of the side portion 62 of bracket 60.

Resilient means 80 for restoring the cam means 50 are constituted by a torsion spring. The torsion spring 80 is wound on the outer periphery of bosses 54, 56 of respective cams 51, 52. One end 81 of the torsion spring 80 is anchored to a suitable portion of the first cam 51, and the other end 82 of the torsion spring is anchored to a hook portion 83, which is formed in the base portion of the U-shaped bracket in the form of a bent ear, in such a manner that the torsion spring 80 itself is torsioned to a some extent (FIG. 6). The end 81 of the torsion spring 80 can also be anchored to the second cam 52, which operates in concurrence with the first cam 51.

As shown in FIG. 2, a cable 84 can be used as an input member for rotating the cam means 50 in dependence upon the throttle opening of the engine. One end of the cable 84 is connected to the engine throttle. The other end of cable 84 is guided by a groove 85 formed in the outer periphery of the first cam 51 at a portion thereof that does not constitute the cam face 53. An anchor piece 86 at the tip of the cable 84 is fit snugly into a recess 87 formed in the outer periphery of the cam 51 at a suitable position thereof.

Rollers 88, 89 are arranged at the distal ends of the plungers 5, 35 that contact the cam faces of the first and second cams 51, 52, thereby assuring smooth rotation of the first and second cams 51, 52.

Figure 8:
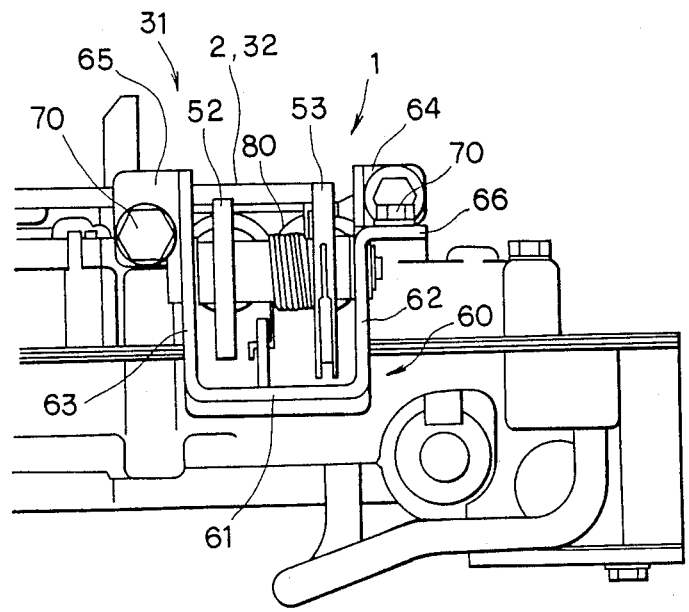
FIG. 8 is a front view of the assembly shown in FIG. 1.

To assemble the throttle valve arrangement having the above-described construction, the torsion spring 80 constituting the resilient means is wound around the bosses 54, 56 of the first and second cams 51, 52, after which the coupling means 57 of both cams 51, 52 are fitted on the cylindrical retaining member 74 and brought into engagement. The bearings 72, 73 are then fitted into the cams 51, 52 from the outer sides thereof to be disposed on both sides of the retaining memer 74. The cam means 50 thus assembled is received in the bracket 60 from the upper part thereof in such a manner that both side faces of the cam means lie parallel to the side portions 62, 63 of the generally U-shaped bracket 60. The cam means 50 is supported by the support shaft 71, which is inserted from the side portion 63 of the bracket 60 and passed through the bearings 72, 73 and the retaining member 74. The support shaft 71 is held in place by the snap ring 75 fitted onto the support shaft 71 from the outer side of the side portion 62 of bracket 60. The support shaft 71 is prevented from rotating by a member 76 inserted from the outer side of the opposing side portion 63 of bracket 60. Next, one end of the torsion spring 80 is securely fastened to the first cam 51 at a suitable location thereon, and the other end of the torsion spring 80 is fastened to the hook 83 of the bracket 60 so as to apply torsion to the spring. The bracket 60 thus assembled is fastened to the front side of the integrated valve bodies 2, 32 by bolts 70, with the first mounting portions 64, 65 lying in a plane perpendicular to the central axes of the valve bores 2a, 32a, respectively, and the second mounting portion 66 lying in a plane parallel to a plane containing at least the two axes of the valve bores 2a, 32a. As shown in FIGS. 1 and 8, the bracket 60 is secured directly to the valve bodies 2, 32 at three points and in two mutually perpendicular planes. This raises positional precision and minimizes any error in throttle pressure setting caused by the mounting manner. Finally, the locking piece 86 of the cable 84 is fitted into the recess 87 of the first cam 51 and the cable is disposed in the groove 85 of the first cam 51. The rear end of the cable 84 is connected via a support member to a part such as the accelerator pedal operatively coupled to the engine throttle.

OPERATION OF FIRST EMBODIMENT

When, e.g., the accelerator pedal of a vehicle equipped with the throttle valve assembly of the present invention is depressed, the throttle of the vehicle engine opens to an extent commensurate with the amount of pedal depression and, in operative association with the accelerator pedal, the cable 84 guided in the peripheral groove 85 of the first cam 51 is pulled. The first cam 51 is rotated by the cable 84 by an amount corresponding to the amount of accelerator pedal depression, and the first cam 51 rotates the second cam 52 through the coupling means 57 operatively coupling the two cams together.

Owing to the rotation of the cams 51, 52, the plungers 5, 35 are made to follow up this motion inside the sleeves 7, 37 via the rollers 88, 89 abutting against the cam faces 53, 55, thereby separately compressing the respective pressure regulating springs 6, 36 to subject them to loads of different magnitude. The supplied hydraulic pressure is regulated in dependence upon the loads applied to the springs 6, 36, with the respective throttle pressures being delivered from the output ports 15, 46.

The throttle pressures act respectively upon the back pressure ports 13, 44 of the valves 1, 31. If the working oil delivered from the output ports 15, 46 increases and the throttle pressures drop, the spool 4 is moved backward to open the valves (lands 11, 41) so that the working oil is supplied in a stable manner at the same time that throttle pressures corresponding to the throttle opening are approached. Conversely, when the amount of working oil diminishes, the spools 4, 34 are advanced to close the valves (lands 11, 41) to effect regulation to predetermined throttle pressures.

If the amount of accelerator pedal depression is reduced, the cams 51, 52 are rotated in the opposite direction by the pressure regulating springs 6, 36 and torsion spring 80 up to the degree of throttle opening. The plungers 5, 35 act by following up this movement of the cams and perform a valving operation of the kind described above.

Figure 9:
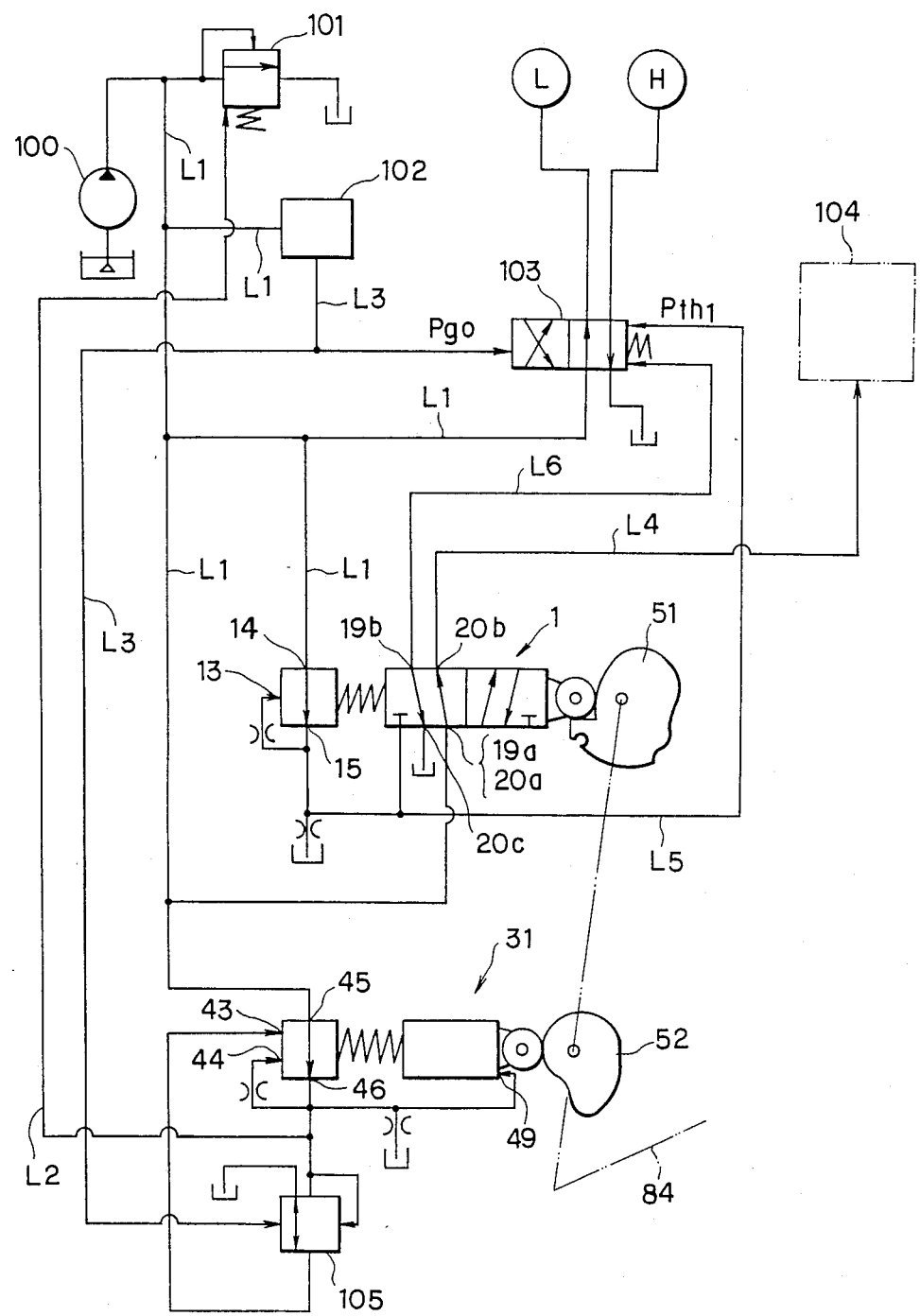
FIG. 9 is view of hydraulic circuitry used in the throttle valve assembly of the present invention.

The operation of the throttle valve assembly of the present invention will now be described in conjunction with the hydraulic circuit diagram shown in FIG. 9, in which numeral 100 denotes a pump, 101 a regulator valve, 102 a governor valve, 103 a shift valve, e.g., a 3–4 shift valve, 104 a lock-up control circuit and 105 a cut-back valve.

When the vehicle engine is started, pressured oil from the pump 100 is fed via a line L1 to the regulator valve 101, governor valve 102, shift valve 103, input ports 14, 19a, 20a of the first throttle valve 1, and input port 45 of the second throttle valve 31. Main pressure in line L1 applied to the port 45 of second throttle valve 31 is regulated by the spring 36 and is delivered as throttle pressure from the port 46. This throttle pressure is fed back to the back pressure port 49 on the side of the plunger 35 and through an orifice to the back pressure port 44 on the side of the spool 34, thereby subjecting throttle pressure to further regulation. The throttle pressure of the second throttle valve 31 acts upon a back pressure port of the regulator valve 101 through a line L2, and main pressure in the line L1 is regulated to a pressure in conformance with the throttle opening by the regulator valve 101.

Main pressure in line L1 applied to the port 14 of first throttle valve 14 is regulated by the spring 6 and is delivered as throttle pressure from the port 15. This throttle pressure ordinarily is set to a value different from that of the throttle pressure of the second throttle valve 31. The throttle pressure of the first throttle valve acts upon one back pressure port of the shift valve 103 via a line L5.

The governor valve 102 delivers an output corresponding to vehicle speed to a line L3. The output on line L3 acts as governor pressure on the other back pressure port of the shift valve 103, namely on the back pressure port that opposes the throttle pressure. It also acts upon one back pressure port of the cut-back valve 105.

When the accelerator pedal connected to the cam 51 by the cable 84 is depressed by only a small amount so that the throttle opening is substantially near zero, the ports 20a, 20b of the first throttle valve 1 communicate and main pressure in line L1 is delivered to the lock-up control circuit 104 via a line L4. During the time that the pressure in line L4 is applied thereto, the lock-up control circuit 104 operates the torque converter in an ordinary manner.

When the accelerator pedal is depressed slightly from the condition in which the throttle opening is near zero, the cam 51 and the cam 52 operatively associated therewith are rotated by the cable 84 connected to the accelerator pedal, whereby the ports 20b, 20c of the first throttle valve are communicated. The pressure in line L4 vanishes owing to the communication between these two ports, so that the lock-up control circuit 104 is directly coupled to the pump and turbine of the torque converter. The plunger 5 is displaced by rotation of the cam 51, thereby compressing the pressure regulating spring 6 to raise the output from port 15 and enlarge the force acting upon the shift valve 103. At the same time, the plunger 35 of the second throttle valve 31 is displaced by rotation of the cam 52, thereby compressing the pressure regulating spring 36 to increase the output from port 46. Though the discharge output of the pump 100 increases with an increase in the output of the vehicle engine, the output from port 46 of the second throttle valve 31 acts upon the regulator valve 101, so that the main pressure in line L1 is made proportional to the throttle opening. With a further increase in throttle opening, the vehicle speed rises and the output of the governor valve 102 also rises in an abrupt manner.

Further depression of the accelerator pedal causes an increase in the throttle opening, whereupon the governor pressure acting on the shift valve 103 overcomes the throttle pressure of the first throttle valve 1 so that the shift valve 103 changes over to effect a speed change from L to H.

When the throttle opening reaches the vicinity of 85° owing to further depression of the accelerator pedal, the ports 19a, 19b of the first throttle valve 1 are communicated by displacement of the plunger 5 caused by rotation of the cam 51 connected to the accelerator pedal by the cable 84. The communication between these ports allows the main pressure in line L1 to act, in opposition to governor pressure, on the shift valve 103 through a line L6. Kick-down is performed as a result.

In an operation separate from that just described, the cut-back valve 105 is actuated by governor pressure when a certain vehicle speed is attained, and the port 46 of the second throttle valve 31 is brought into communication with the port 43 of valve 31. Communication between these two ports reduces the output from port 46 and increases the amount of leakage at the regulator valve 101, with the result that main pressure in line L1 drops and is held at a predetermined value.

When the amount of accelerator pedal depression is reduced to diminish the throttle opening, operation is the reverse of that described above.

SECOND EMBODIMENT

Figure 10:
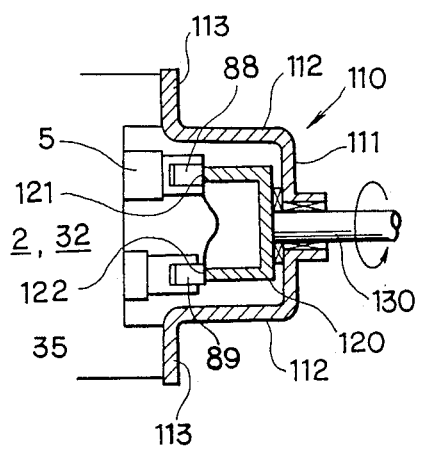
FIG. 10 is a sectional view showing another embodiment of a throttle valve assembly according to the present invention.

FIG. 10 is a sectional view showing a second embodiment of a throttle valve assembly according to the invention. A bracket 110 of a generally U-shaped configuration has a base portion 111, generally parallel side portions 112 formed by bending the base portion 111 upwardly from both sides thereof, and mounting portions 113 formed by bending the two side portions 112.

Cam means 120 is constituted by a cylindrical cam having an end face formed to include the cam face of a first cam 121 for displacing the plunger 5 of the first throttle valve as well as the cam face of a second cam 122 for displacing the plunger 35 of the second throttle valve 31.

A support shaft 130 fixedly secured to the base portion of the cam means 120 for supporting the cam means is rotatably journaled in the base portion 111 of the bracket 110.

The support shaft 130 is arranged to be rotated in operative association with the engine throttle by an input member, which is not shown.

As many apparently widely different embodiments of the present invention can be made without departing from the spirit and scope thereof, it is to be understood that the invention is not limited to the specific embodiments thereof, the scope being defined in the appended claims.

What is claimed is:

1. A throttle valve assembly for an automatic transmission, comprising:
   first and second throttle valves adjoining each other, each throttle valve having a movable valve element;
   cam means rotatably mounted on a fixed support member and disposed therein for rotation about an axis, said cam means including a first cam having a first cam face for displacing the valve element of said first throttle valve and a first boss extending in the axial direction, and a second cam having a second cam face for displacing the valve element of said second throttle valve and a second boss extending in the axial direction, said first and second bosses are in abutting engagement with one another such that said first and second cams are connected for common rotation; and
   resilient means surrounding at least one of said bosses, with one end of said resilient means connected to one of said cams and the other end connected to said support member for maintaining said abutting engagement,
   an input member operatively associated with a torque demand signal of the engine and directly coupled to one of said first and second cams for rotating said first and second cams.

2. The throttle valve assembly as defined in claim 1 wherein said cams are rotatable about an axis perpendicular to a movement direction of said valve elements.

3. The throttle valve assembly as defined in claim 1, wherein said cams include cam faces formed on a cup-shaped cam body.

4. The throttle valve assembly as defined in claim 1, wherein said first and second valve elements are movable in parallel directions.

5. The throttle valve assembly as defined in claim 1, wherein resilient means is disposed to urge said cam means to rotate in an opposing direction to the input member movement.

6. An assembly according to claim 1, wherein said connecting means comprises an axial cut-out and an axial projection in each boss which mate axially with a corresponding axial projection and axial cut-out in the other boss.

7. A throttle valve assembly for an automatic transmission, comprising:
   first and second throttle valves adjoining each other, each throttle valve including a valve body with a front side and a movable valve element within said body, said front sides facing in the same general direction;
   a one-piece generally U-shaped bracket attached to said front sides of said throttle valves and formed by a bent member comprising a base portion, a pair of generally parallel side portions bent upwardly from opposite edges of said base portion, and a pair of mounting portions bent laterally from upper ends of said side portions, said base portion including a bent ear;
   cam means carried by said bracket and comprising a support shaft mounted on said bracket, first and second cams for displacing said valve elements of said first and second valves, respectively, said cams mounted for common rotation on said shaft;
   resilient means for yieldably biasing said first and second cams to a predetermined rotary position, one end of said resilient means anchored to a portion of said first cam, and the other end thereof anchored to said bent ear;
   said bracket, said arm means, and said resilient means comprising a pre-assembled unit adapted to be mountable and dismountable as a unit relative to said valve bodies; and
   an input member operably associated with a torque demand signal of the engine and directly connected to one of said first and second cams for rotating said cams.

8. A throttle valve assembly for an automatic transmission, comprising:
   a plurality of throttle valves including valve body means having parallel valve bores for conducting fluid to regulate hydraulic pressure and bring such pressure into conformance with a predetermined pressure, and a plurality of valve elements movable within said bores to vary the pressure regulating action;
   a one-piece bracket secured to said valve body means and including a plurality of first mounting portions disposed perpendicular relative to central axes of said valve bores, and a second mounting portion disposed parallel to said central axis, said first and second mounting portions disposed against cooperative surfaces of said body means to locate and stabilize the bracket in two mutually perpendicular planes to minimize any error in throttle pressure setting;

at least two cams being mounted for common rotation in longitudinally spaced relationship, said cam being rotatably mounted on a support shaft supported on said bracket and including cam faces for displacing respective ones of said valve elements;

an input member directly connected to said cam means for providing an input signal to rotate said cam means in response to torque demand signals of the engine; and resileint means disposed between said cams with one end of said resilient means being connected to said bracket and the other end being connected to one of said cams for yieldably biasing said cam means to a predetermined rotational position.

9. A throttle valve assembly according to claim 8, wherein said bracket is of generally U-shaped configuration and is formed by a bent member corprising a base portion, a pair of generally parallel side portions bent upwardly from opposite edges of said base portion, and a pair of mounting portions bent laterally from upper ends of said side portions, said first seat faces being disposed on said mounting portions, said second seat face defined by a bent portion of one of said side portions.

* * * * *